US011982121B1

(12) United States Patent
Roberts et al.

(10) Patent No.: US 11,982,121 B1
(45) Date of Patent: *May 14, 2024

(54) RETENTION CLIP ASSEMBLIES, RETENTION SYSTEMS AND METHODS

(71) Applicant: ANDERSEN CORPORATION, Bayport, MN (US)

(72) Inventors: Kevin Roberts, Oceanside, CA (US); John Flynn, Temecula, CA (US)

(73) Assignee: ANDERSEN CORPORATION, Bayport, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,202

(22) Filed: Mar. 23, 2023

Related U.S. Application Data

(63) Continuation of application No. 17/562,251, filed on Dec. 27, 2021, now Pat. No. 11,643,866.

(60) Provisional application No. 63/131,372, filed on Dec. 29, 2020.

(51) Int. Cl.
*E06B 3/54* (2006.01)
*E06B 3/58* (2006.01)

(52) U.S. Cl.
CPC .......... *E06B 3/5481* (2013.01); *E06B 3/5821* (2013.01)

(58) Field of Classification Search
CPC ............................ E06B 3/5481; E06B 3/5821
See application file for complete search history.

(56) References Cited

U.S. PATENT DOCUMENTS

| | | | | |
|---|---|---|---|---|
| 2,497,515 A | 2/1950 | Pearse | E06B 3/56 | 52/DIG. 1 |
| 3,698,148 A * | 10/1972 | Marantier | E06B 3/62 | 52/204.597 |
| 4,134,238 A | 1/1979 | Auger | E06B 3/5409 | 52/656.5 |
| 4,412,406 A * | 11/1983 | Sengoku | E06B 3/5481 | 52/204.591 |
| 4,680,903 A * | 7/1987 | Horgan, Jr. | E06B 3/5409 | 52/766 |
| 4,837,993 A * | 6/1989 | Studenski | E06B 3/02 | 52/766 |
| 6,434,905 B1 | 8/2002 | Sprague | E06B 3/02 | 49/501 |
| 6,517,056 B2 * | 2/2003 | Shepherd | E04F 11/1851 | 256/65.01 |
| 7,584,588 B2 * | 9/2009 | Kim | E06B 3/5864 | 52/204.597 |
| 7,877,939 B2 * | 2/2011 | Knapp | E06B 3/5828 | 52/204.55 |
| 7,963,077 B2 * | 6/2011 | Lin | E06B 3/72 | 52/204.597 |

(Continued)

FOREIGN PATENT DOCUMENTS

| | | | |
|---|---|---|---|
| CH | 691915 A5 * | 11/2001 | E06B 3/5481 |
| CN | 108301736 A | 7/2018 | |

(Continued)

*Primary Examiner* — Ryan D Kwiecinski
(74) *Attorney, Agent, or Firm* — Mueting Raasch Group

(57) ABSTRACT

Retention clip assemblies, retention systems, and methods of using the same. The retention clip assemblies, retention systems and methods described herein may be used to retain glass lites and, potentially, other panels, in frame openings provided in fenestration unit frames.

20 Claims, 10 Drawing Sheets

(56) References Cited

U.S. PATENT DOCUMENTS

| | | | | |
|---|---|---|---|---|
| 8,621,793 | B2 | 1/2014 | Abdul Lathief | E06B 3/62<br>52/656.5 |
| 8,813,437 | B1 | 8/2014 | Spofford | |
| 8,904,719 | B2 | 12/2014 | Knapp | |
| 9,683,402 | B2 * | 6/2017 | Abdul Lathief | E04F 11/1846 |
| 9,752,375 | B2 | 9/2017 | Jones | E06B 3/585 |
| 9,777,484 | B2 * | 10/2017 | Header | E04F 11/1853 |
| 10,030,393 | B2 * | 7/2018 | Spence | E04F 11/1853 |
| 10,267,082 | B2 * | 4/2019 | Knapp | E06B 3/302 |
| 10,626,662 | B2 | 4/2020 | Philips | E06B 3/2632 |
| 10,871,026 | B1 | 12/2020 | Mourchid | E06B 3/5409 |
| 10,876,297 | B1 * | 12/2020 | Poma | E04F 11/1812 |
| 11,187,323 | B2 * | 11/2021 | Sprague | F16J 15/0818 |
| 11,286,710 | B2 | 3/2022 | Pedersen | E06B 3/5885 |
| 11,352,830 | B2 | 6/2022 | Fielding | E06B 3/5828 |
| 11,643,866 | B1 * | 5/2023 | Roberts | E06B 3/5409<br>52/204.64 |
| 2015/0007514 | A1 | 1/2015 | Lathief | E04F 11/1853<br>29/525.08 |
| 2020/0003002 | A1 | 1/2020 | Walter | E06B 3/5821 |
| 2020/0318421 | A1 | 10/2020 | Murray | E06B 3/02 |
| 2021/0054680 | A1 | 2/2021 | Benes | E06B 3/5409 |
| 2022/0018177 | A1 | 1/2022 | Mourchid | E06B 3/5864 |

FOREIGN PATENT DOCUMENTS

| | | | | | |
|---|---|---|---|---|---|
| CN | 110388167 | A | | 10/2019 | E05B 3/00 |
| DE | 29809323 | U1 | | 8/1998 | E06B 3/2632 |
| DE | 202015106963 | U1 | * | 4/2017 | E04F 11/1812 |
| DE | 102017005034 | A1 | * | 11/2018 | |
| DE | 202019107047 | U1 | | 4/2021 | |
| EP | 1932998 | A1 | | 6/2008 | E06B 3/26303 |
| EP | 3396097 | A1 | | 10/2018 | |
| EP | 3633131 | A1 | * | 4/2020 | |
| EP | 3235996 | B1 | | 12/2020 | E06B 3/5814 |
| FR | 2435594 | A1 | | 4/1980 | |
| FR | 2714693 | A1 | | 7/1995 | E06B 3/308 |
| FR | 2998606 | A1 | | 5/2014 | E06B 3/5821 |
| GB | 2138875 | A | | 10/1984 | E06B 3/62 |
| GB | 2228966 | A | * | 9/1990 | E06B 3/5821 |
| GB | 2272244 | A | * | 5/1994 | E06B 3/5821 |
| GB | 2284634 | A | * | 6/1995 | E06B 3/5821 |
| GB | 2451468 | A | * | 2/2009 | E06B 3/5409 |
| GB | 2470580 | A | * | 12/2010 | E06B 3/2632 |
| GB | 2548605 | A | * | 9/2017 | E06B 3/54 |
| GB | 2576348 | A | | 2/2020 | E06B 3/58 |
| GB | 2576349 | A | | 2/2020 | E06B 3/58 |
| KR | 2019012778 | A | | 2/2019 | E06B 3/5481 |
| WO | WO-2012107259 | A1 | | 8/2012 | E06B 3/5821 |
| WO | WO-2013048354 | A1 | | 4/2013 | E06B 3/5864 |

* cited by examiner

FIG. 20
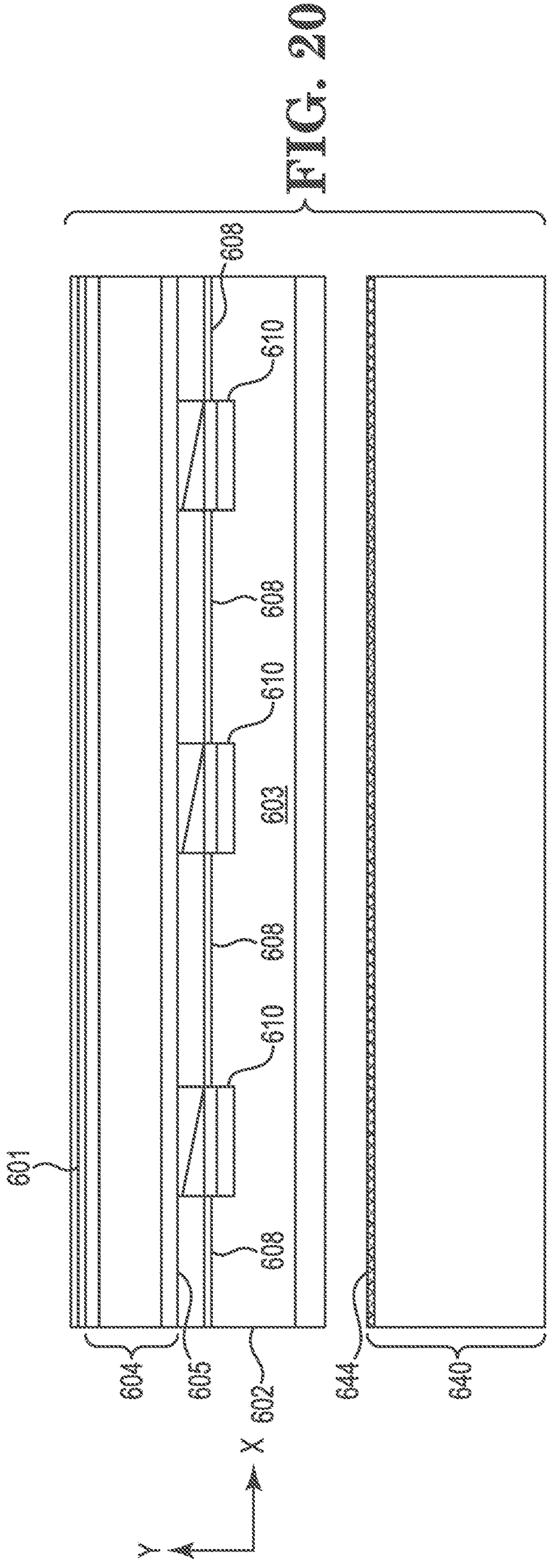
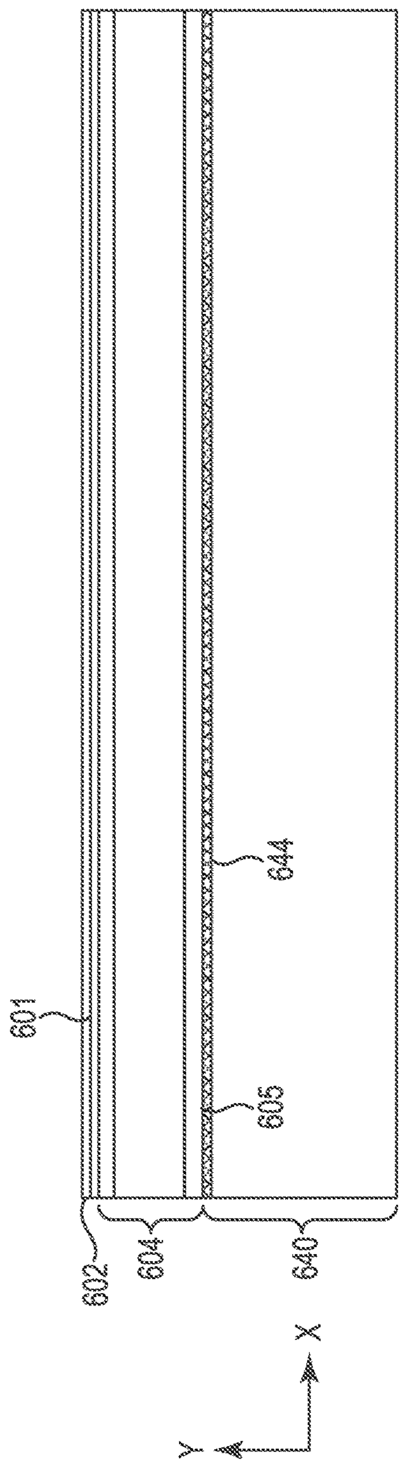
FIG. 21

RETENTION CLIP ASSEMBLIES, RETENTION SYSTEMS AND METHODS

RELATED APPLICATION

This application is a continuation of U.S. patent application Ser. No. 17/562,251, filed Dec. 27, 2021, which claims the benefit under 35 U.S.C. Section 119 of U.S. Provisional Patent Application Ser. No. 63/131,372 entitled RETENTION CLIP ASSEMBLIES, RETENTION SYSTEMS AND METHODS filed on Dec. 29, 2020, which is incorporated herein by reference in its entirety.

FIELD

Retention clip assemblies, retention systems, and methods of using the same are described herein.

BACKGROUND

Glass lites are commonly retained in window and door sash frames using glazing points on the exterior of the fenestration units or glass stops on the interior of the fenestration units. Variations in dimensions of the various components, along with the desire for sealing the fenestration units to limit or prevent the passage of water and/or air through the fenestration units presents a variety of challenges that are not fully met using current techniques of retaining glass lites in frame openings.

SUMMARY

Retention clip assemblies, retention systems, and methods of using the same are described herein. The retention clip assemblies, retention systems and methods described herein may be used to retain glass lites and, potentially, other panels, in frame openings provided in fenestration unit frames.

The retention clip assemblies used in the retention systems and methods described herein provide a variety of advantages over known techniques of retaining glass lites in frame openings. For example, as the weight of glass lites in fenestration units increases due to, e.g., increasing size of the glass lites to provide larger viewable openings and/or triple pane glass lites to improve energy efficiency, the need for increasing security in glass lite retention in those fenestration units has also increased. That increased security may be useful both during transportation of fenestration units to their ultimate location as well as in use to, for example, resist forces such as wind loads, etc. after installation of the fenestration units in a building or other structure.

In addition, glass retention in fenestration units can also be challenging because glass lites can vary in thickness, either intentionally (e.g., when selecting between a double pane or triple pane glass lite, when selecting between glass lites having varying glass thickness and/or varying dead space between panes, etc.) or as a result of manufacturing tolerances. The retention clip assemblies and retention systems described herein are particularly useful in adapting to variations in glass lite thickness, as well as providing for increased and consistent retention forces applied to the glass lites to retain them in fenestration unit frames.

Furthermore, in some instances, the retention clip assemblies and retention systems described herein may eliminate the need for flowable materials such as silicone or other similar materials to create seals and/or assist in retaining a glass lite in a fenestration unit frame. Those flowable materials may be difficult and costly to apply and, in some instances, may fail prematurely as a result of movement of a fenestration unit either during manufacturing, during transit, or during installation.

In one aspect, one or more embodiments of a glass lite retention system as described herein includes: a glass lite positioned in a frame opening, wherein each edge of the glass lite faces a frame member defining a portion of the frame opening; and a plurality of retention clip assemblies positioned around a perimeter of the glass lite. Each retention clip assembly comprises: a base member comprising a frame surface facing a frame member defining a portion of the frame opening, and a compression surface facing a major surface of the glass lite, wherein the compression surface is angled relative to the length of the frame member such that a first end of the compression surface is closer to the major surface of the glass lite than a second end of the compression surface; a spring member extending from the base member to a location between the edge of the glass lite and the frame member, the spring member being retained between the edge of the glass lite and the frame member; interlocking features on the frame surface of the base member and the frame member, wherein the interlocking features prevent movement of the base member in a direction transverse to a length of the frame member when the spring member is located between the edge of the glass lite and the frame member; and a wedge located between the compression surface and the major surface of the glass lite, wherein the wedge comprises a leading end and a trailing end, wherein a thickness of the wedge measured in a direction normal to the major surface of the glass lite increases when moving from the leading edge to the trailing edge, and wherein translation of the leading end of the wedge towards the first end of the compression surface in a compression direction aligned with the edge of the glass lite forces the wedge into contact with the major surface of the glass lite.

In one or more embodiments of a glass lite retention system as described herein, the interlocking features comprise a channel in the frame member and a raised fin extending from the frame surface of the base member, wherein the channel is configured to receive the fin when the spring member is located between the edge of the glass lite and the frame member.

In one or more embodiments of a glass lite retention system as described herein, the interlocking features comprise a channel on the frame surface of the base member and a ridge extending from the frame member towards the frame opening, wherein the channel is configured to receive the ridge in an interlocking relationship. In one or more embodiments, the frame surface of the base member comprises a plurality of channels arranged to change the position of the base member with respect to the glass lite when the ridge on the frame member is located in different channels of the plurality of channels.

In one or more embodiments of a glass lite retention system as described herein, the spring member is at least partially compressed between the edge of the glass lite and the frame member.

In one or more embodiments of a glass lite retention system as described herein, the wedge comprises a front surface and a back surface, wherein the front surface faces the major surface of the glass lite and the back surface faces the compression surface of the base member, wherein the thickness of the wedge is measured between the front surface and the back surface. In one or more embodiments, the back surface comprises a first plurality of ridges extending transverse to a wedge axis extending between the leading edge and the trailing edge of the wedge, and wherein the compression surface comprises a second plurality of ridges extending transverse to the wedge axis, wherein the first plurality of ridges and the second plurality of ridges interact to resist movement of the wedge in a direction towards the second end of the compression surface after the first plurality of ridges on the wedge engage the second plurality of ridges on the compression surface.

In one or more embodiments of a glass lite retention system as described herein, the compression surface comprises a bottom edge and a top edge, wherein the bottom edge is located between the top edge and the frame member, wherein the bottom edge extends between the first end and the second end of the compression surface and the top edge extends between the first end and the second end of the compression surface, and wherein the top edge is located closer to the major surface of the glass lite than the bottom edge such that the compression surface is angled relative to the major surface of the glass lite. In one or more embodiments, the thickness of the wedge decreases when moving from the bottom edge to the top edge of the compression surface. In one or more embodiments, the wedge comprises a front surface and a back surface, wherein the front surface faces the major surface of the glass lite and the back surface faces the compression surface of the base member, wherein the thickness of the wedge is measured between the front surface and the back surface, and wherein the thickness of the wedge decreases when moving from the bottom edge to the top edge of the compression surface.

In one or more embodiments of a glass lite retention system as described herein, the glass lite retention system comprises a glass stop member comprising a glazing edge configured to abut the major surface of the glass lite above the wedge, and wherein the glass stop covers the base member located between the glass stop member and the frame member. In one or more embodiments, the base member comprises a glass stop channel and the glass stop member comprises a retention fin configured to interact with the glass stop channel to retain the glass stop member on the base member when the glazing edge of the glass stop member abuts the major surface of the glass lite above the wedge. In one or more embodiments, the base member comprises a glass stop member retainer and the glass stop member comprises a channel configured to receive the glass stop member retainer such that the glass stop member is retained on the base member when the glazing edge of the glass stop member abuts the major surface of the glass lite above the wedge.

In a second aspect, one or more embodiments of a method of retaining a glass lite in a frame opening of a frame as described herein includes locating a plurality of retention clip assemblies along a perimeter of a glass lite located in a frame opening of a frame. Locating each retention clip assembly of the plurality of retention clip assemblies comprises: locating a spring member of the retention clip assembly between an edge of the glass lite and a frame member forming a part of the frame, the spring member being retained between the edge of the glass lite and the frame member, wherein, when the spring member is located between the edge of the glass lite and a frame member, a frame surface of a base member of the retention clip assembly faces the frame member adjacent the spring member and a compression surface of the base member faces a major surface of the glass lite, wherein the compression surface is angled relative to the length of the frame member such that a first end of the compression surface is closer to the major surface of the glass lite than a second end of the compression surface. The method further comprises preventing movement of the base member of each retention clip assembly of the plurality of retention clip assemblies in a direction normal to the major surface of the glass lite when the spring member of each retention clip assembly is located between the edge of the glass lite and the frame member by aligning interlocking features on the frame surface of the base member and the frame member; and providing a retention force on the major surface of the glass lite to retain the glass lite in the frame opening using each retention clip assembly of the plurality of retention clip assemblies by, for each retention clip assembly of the plurality of retention clip assemblies, advancing a wedge between the compression surface and the major surface of the glass lite in a direction parallel to the major surface of the glass lite and aligned with the edge of the glass lite retaining the spring member, wherein the wedge is forced into contact with major surface of the glass lite to provide the retention force.

In one or more embodiments of the methods of retaining a glass lite in a frame opening of a frame as described herein, the wedge of each retention clip assembly of the plurality of retention clip assemblies comprises a leading end and a trailing end, wherein a thickness of the wedge measured in a direction normal to the major surface of the glass lite increases when moving from the leading edge to the trailing edge, and wherein advancing the wedge comprises advancing the leading end of the wedge towards the first end of the compression surface to force the wedge into contact with the major surface of the glass lite.

In one or more embodiments of the methods of retaining a glass lite in a frame opening of a frame as described herein, the interlocking features comprise a channel in the frame member and a raised fin extending from the frame surface of the base member, wherein aligning the interlocking features comprises locating the fin in the channel.

In one or more embodiments of the methods of retaining a glass lite in a frame opening of a frame as described herein, the interlocking features comprise a channel on the frame surface of the base member and a ridge extending from the frame member towards the frame opening, wherein aligning the interlocking features comprises locating the ridge in the channel. In one or more embodiments, the frame surface of the base member comprises a plurality of channels arranged to change the position of the base member with respect to the glass lite when the ridge on the frame member is located in different channels of the plurality of channels.

In one or more embodiments of the methods of retaining a glass lite in a frame opening of a frame as described herein, the spring member is at least partially compressed between the edge of the glass lite and the frame member.

In one or more embodiments of the methods of retaining a glass lite in a frame opening of a frame as described herein, the method comprises retaining the wedge in position relative to the compression surface after advancing the wedge between the compression surface and the major surface of the glass lite. In one or more embodiments, retaining the wedge in position comprises aligning interlocking ridges on each of the wedge and the compression surface.

In a third aspect, one or more embodiments of a glazing system as described herein includes: a glass lite positioned in a frame opening, wherein each edge of the glass lite faces a frame member defining a portion of the frame opening; and a plurality of retention clip assemblies positioned around a perimeter of the glass lite. Each retention clip assembly comprises: a base member comprising a frame surface facing a frame member defining a portion of the frame opening, and a compression surface facing a major surface of the glass lite, wherein the compression surface is angled relative to the length of the frame member such that a first end of the compression surface is closer to the major surface of the glass lite than a second end of the compression surface; a spring member extending from the base member to a location between the edge of the glass lite and the frame member, the spring member being retained between the edge of the glass lite and the frame member; means for preventing movement of the base member in a direction transverse to a length of the frame member when the spring member is located between the edge of the glass lite and the frame member; and a wedge located between the compression surface and the major surface of the glass lite, wherein the wedge comprises a leading end and a trailing end, wherein a thickness of the wedge measured in a direction normal to the major surface of the glass lite increases when moving from the leading edge to the trailing edge, and wherein translation of the leading end of the wedge towards the first end of the compression surface in a compression direction aligned with the edge of the glass lite forces the wedge into contact with the major surface of the glass lite.

In one or more embodiments of the glazing systems described herein, the means for preventing movement of the base member in a direction transverse to the length of the frame member comprises interlocking features on the frame surface of the base member and the frame member. In one or more embodiments, the interlocking features comprise a channel on the frame surface of the base member and a ridge extending from the frame member towards the frame opening, wherein the channel is configured to receive the ridge in an interlocking relationship. In one or more embodiments, the interlocking features comprise a channel in the frame member and a raised fin extending from the frame surface of the base member, wherein the channel is configured to receive the fin when the spring member is located between the edge of the glass lite and the frame member.

In one or more embodiments of the glazing systems described herein, the means for preventing movement of the base member in a direction transverse to the length of the frame member comprises a mechanical fastener extending through the frame surface of the base member and into the frame member.

In one or more embodiments of the glazing systems described herein, the means for preventing movement of the base member in a direction transverse to the length of the frame member comprises adhesive located between the frame surface of the base member and the frame member.

Where used herein, positional terms such as "top," "bottom," "above," "below," etc. are used for reference relative to each other when the retention clip assemblies and retention systems described herein are installed in a fenestration unit. These terms should not be construed narrowly and may, in actual use, be reversed. For example, a first component described as being above a second component may, in actual use, be located below the second component.

Where used herein, the terms "exterior" and "interior" are used only in a relative sense, for example, an exterior surface and an interior surface may be used to describe surfaces located on opposite sides of a fenestration unit. In actual use, and exterior surface could be found within the interior of a building or other structure where the surface would conventionally be defined as an interior surface, while an interior surface could be found outside of a building or other structure where the surface would conventionally be defined as an exterior surface.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the retention clips, retention clip systems, and methods of using the same as described herein. Rather, a more complete understanding of the invention will become apparent and appreciated by reference to the following Description of Illustrative Embodiments and claims in view of the accompanying figures of the drawing.

BRIEF DESCRIPTION OF THE VIEWS OF THE DRAWING

Each of the figures described herein include axes corresponding to a three dimensional Cartesian coordinate system to facilitate an understanding of the illustrative embodiments of the invention depicted in the figures and described herein.

FIG. 20 is a schematic diagram of another illustrative embodiment of a glass stop removed from a frame member on which a set of retention clip assemblies are positioned to retain a glass lite in position as described herein.

FIG. 21 is a schematic diagram of the components depicted in FIG. 20 after the glass stop is positioned over the retention clip assemblies and against the glass lite as described herein.

DESCRIPTION OF ILLUSTRATIVE EMBODIMENTS

Figure 1:
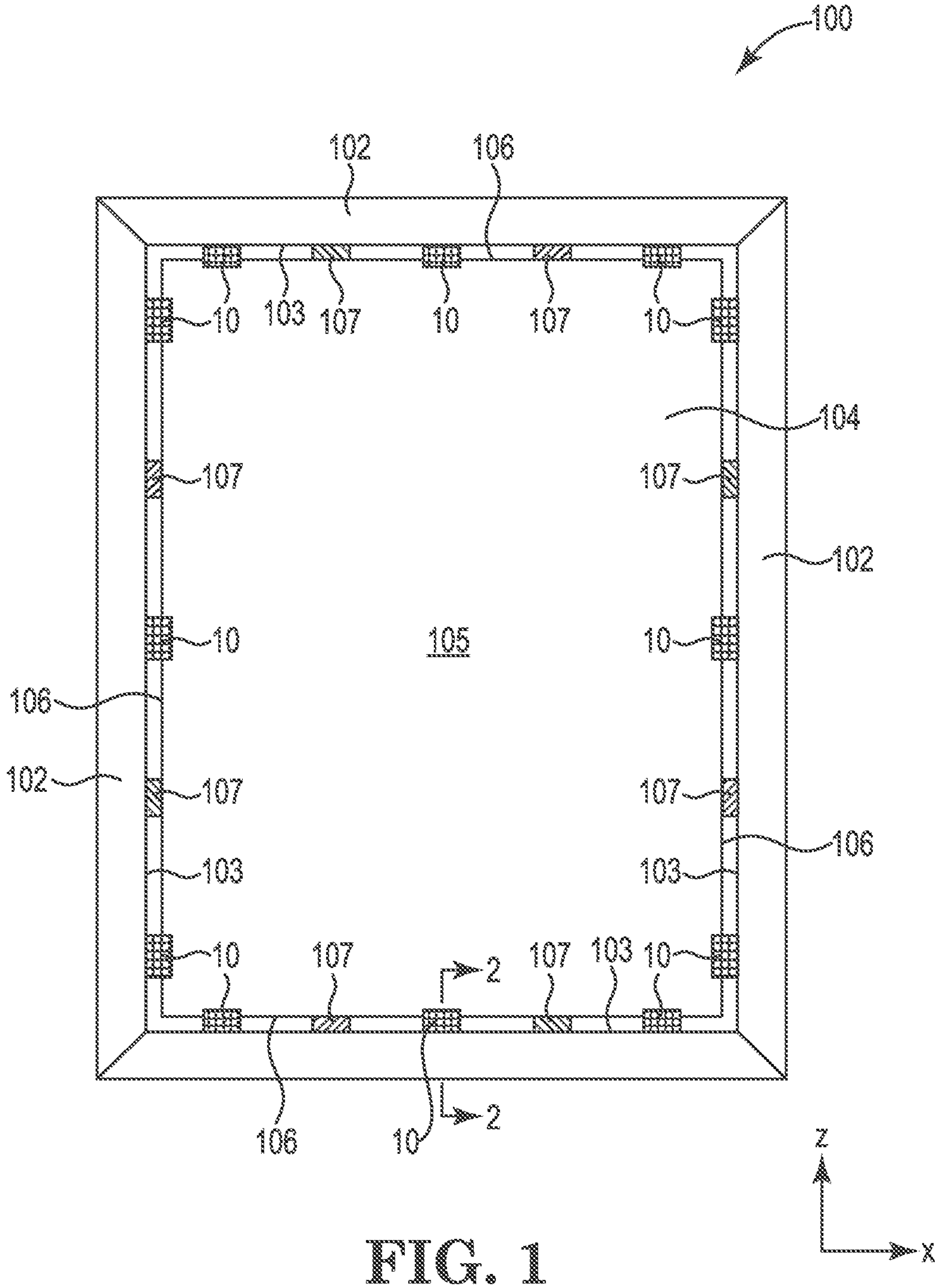
FIG. 1 is a plan view of one illustrative embodiment of a fenestration unit frame including a glass lite retained by a plurality of retention clip assemblies as described herein.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

One illustrative embodiment of a glass lite retention system 100 is depicted in FIG. 1. The glass lite retention system includes a glass lite 104 located within a frame opening defined by frame members 102 surrounding the frame opening and the glass lite 104 located therein. The glass lite 104 includes a major surface 105 located in the XZ plane, with the major surface 105 being defined by edges 106 of glass lite 104. Each of frame members 102 includes a frame member surface 103 facing the edges 106 of the glass lite 104.

The glass lite 104 is positioned within the frame opening defined by frame members 102 using spacer blocks 107 located about the perimeter of the glass lite 104 as defined by the edges 106 of the glass lite 104. Typically, spacer blocks 107 will both fix the position of the glass lite 104 in the frame opening defined by the frame member surfaces 103 of the frame members 102 and, where needed, also support the glass lite 104 in the frame depending on the orientation of the system 100.

In addition to spacer blocks 107, retention clip assemblies 10 are also positioned about the perimeter of the glass lite 104, with the retention clip assemblies being spaced apart around the glass lite 104 to retain the glass lite in the frame defined by frame members 102. The depicted number and/or arrangement of spacer blocks 107 and/or retention clip assemblies 10 is illustrative in nature only and, depending on the size of the frame and glass lite, the weight of the glass lite, and any expected forces to be applied to the glass lite, the number of spacer blocks 107 and/or retention clip assemblies 10 may be increased or decreased.

Figure 2:
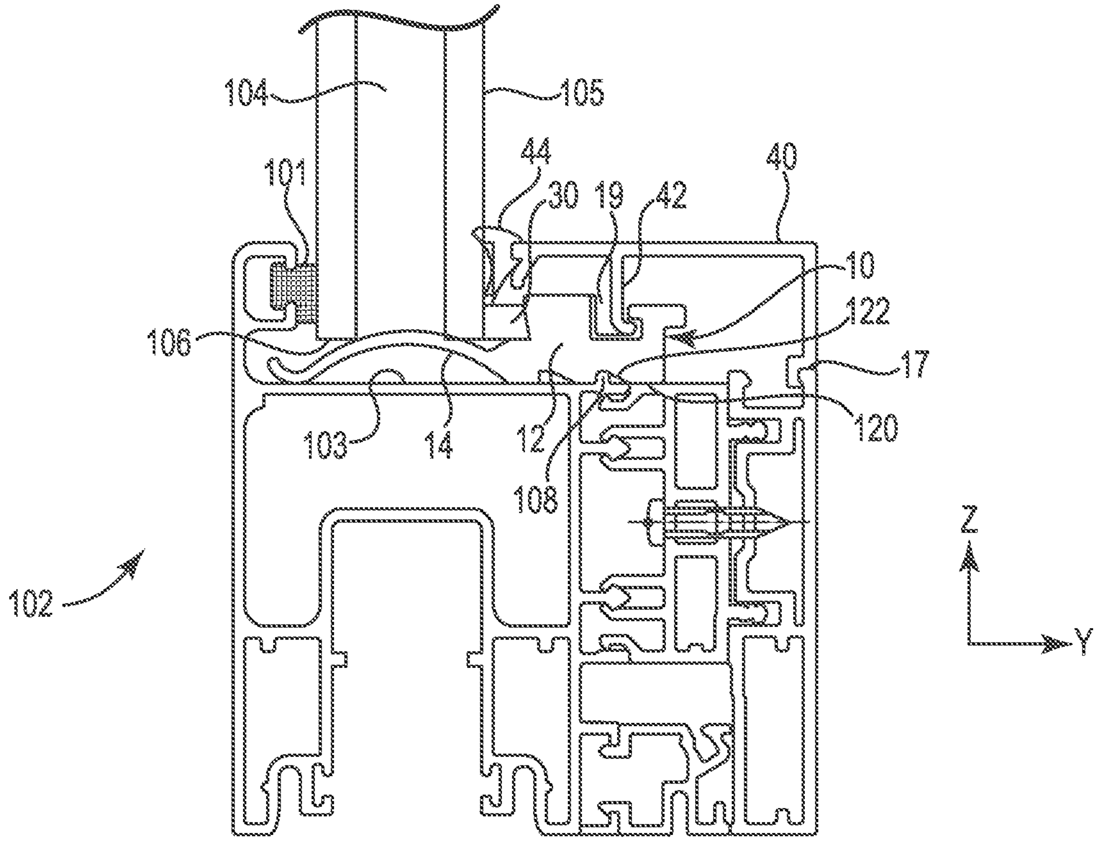
FIG. 2 is an enlarged cross-sectional view of one illustrative embodiment of a retention clip assembly retaining the glass lite of FIG. 1 in the frame of FIG. 1 after positioning of a glass stop on the frame member over the retention clip assembly (the glass stop not being depicted in FIG. 1), the cross-sectional view being taken along line 2-2 in FIG. 1.

A cross-sectional view of the illustrative embodiment of one of the retention clip assemblies 10 seen in FIG. 1 is depicted in FIG. 2 which is taken along section line 2-2 in FIG. 1. FIG. 2 does include a glass stop member 40 that is not depicted in FIG. 1 to allow for viewing of the spacer blocks 107 and retention clip assemblies 10 positioned around the perimeter of the glass lite 104.

The depicted illustrative embodiment of frame member 102 includes a frame member surface 103 facing the edge 106 of the glass lite 104. Glass lite 104 also includes a major surface 105 against which the retention clip assembly 10 acts to retain the glass lite 104 in the frame opening as described herein. In particular, the retention clip assembly 10 (which is described in more detail below) acts on the major surface 105 of the glass lite 104 to force the glass lite 104 against seal 101 located opposite the glass stop member 40. In other words, the retention clip assembly 10 provides a force along the Y axis in the direction of the seal 101 to retain glass lite 104 in position in the frame opening.

The depicted illustrative embodiment of the retention clip assembly 10 includes, with reference to FIGS. 3-11 depicting various features of the retention clip assembly 10, a base member 12 and a spring member 14. When positioned in the frame opening on frame member 102, the spring member 14 of the retention clip assembly 10 is located between the edge 106 of glass lite 104 and the frame member surface 103 to retain the retention clip assembly 10 in position. The depicted embodiment of spring member 14 includes a pair of arms 15, although any suitable form for spring member that provides for retention of the spring member 14 between the edge 106 of the glass lite 104 and the frame member surface 103 of frame member 102 would be acceptable. In one or more embodiments, the spring member may be at least partially compressed between the edge 106 of the glass lite 104 and the frame member surface 103. That compression may, for example, provide friction to assist in retaining the retention clip assembly 10 in place during assembly of the glass lite 104 in the frame opening.

Although the base member 12 and spring member 14 of the retention clip assembly 10 are depicted as one-piece, unitary items, it should be understood that they could be manufactured separately and attached to each other as needed to perform their respective functions.

The retention clip assembly 10 also includes a base member 12 that includes a frame surface 20 which faces the frame member surface 103 of frame member 102 when the retention clip assembly 10 is properly located as seen in, e.g., FIG. 2. The base member 12 also includes a compression surface 16 facing the major surface 105 of the glass lite 104. As depicted in, e.g., FIGS. 3-4, the compression surface 16 is angled relative to the length of the frame member 102 (where the length of the frame member extends along the X axis). As a result, the angled compression surface 16 includes a first end 16-1 that is closer to the major surface 105 of glass lite 104 than a second end 16-2 of the compression surface 16.

The depicted illustrative embodiment of retention clip assembly 10 also includes interlocking features on the frame surface 20 of the base member 12 and the frame member surface 103 of the frame member 102. The interlocking features are provided to prevent movement of the base member 12 (and, therefore, the retention clip assembly 10 as a whole) in a direction transverse to a length of the frame member 102 when the spring member 14 is located between the edge 106 of the glass lite 104 and the frame member surface 103 of the frame member 102. As noted herein, the length of the frame member 102 is, in the views depicted in FIGS. 2-5 along the X axis.

With reference to FIGS. 2, 5, and 9-11, the depicted illustrative embodiment of retention clip assembly 10 includes interlocking features in the form of one or more channels 22 on the frame surface 20 of the base member 12 and a ridge 108 extending upwards from the frame member 102 towards the frame opening in which glass lite 104 is located. The channels 22 are each configured to receive the ridge 108 in an interlocking relationship which, with reference to FIG. 9, restricts or prevents movement of the base member 12 of the retention clip assembly 10 from moving in the Y direction away from the glass lite 104. Providing two or more channels 22 on the frame surface 20 of the base member 12 of the retention clip assembly 10 allows for changing positions of the base member 12 with respect to the glass lite 104 to assist with proper operation of the retention clip assembly 10 as described herein.

Figure 3:
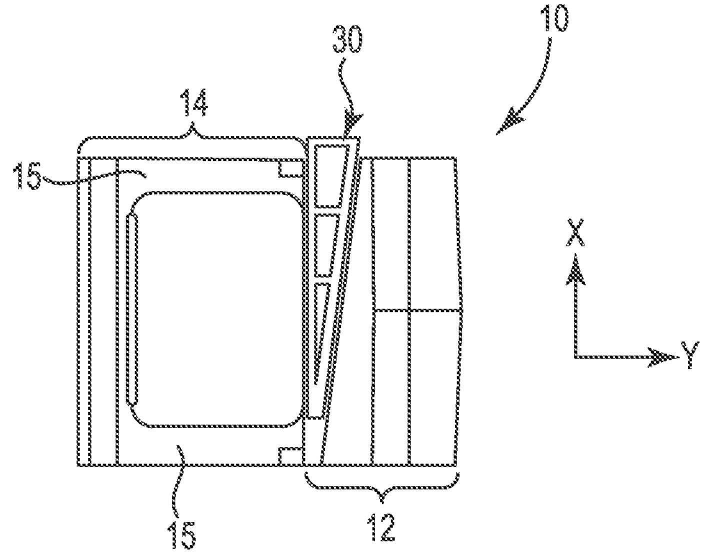
FIG. 3 is a plan view of the retention clip assembly of FIG. 2 removed from the fenestration unit frame opening of FIG. 2.
Figure 4:
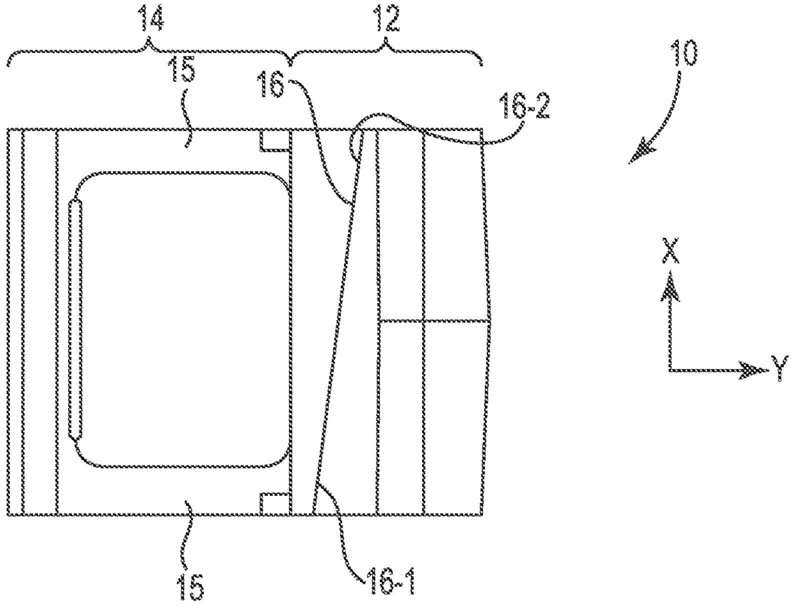
FIG. 4 is a plan view of the base member and spring member of the retention clip assembly of FIG. 3 after removal of the wedge seen in FIG. 3.

With the spring member 14 and base member 12 of the retention clip assembly 10 positioned as seen in, e.g., FIG. 2, the wedge 30 of the retention clip assembly 10 can be moved into position to provide the retention forces on the glass lite 104 as described herein. The wedge 30 is seen in position between the compression surface 16 of the base member 12 and the major surface 105 of the glass lite 104 in FIG. 2. With reference to FIG. 3, the wedge 30 is depicted in position against the compression surface 16 in the absence of the glass lite 104.

Figure 6:
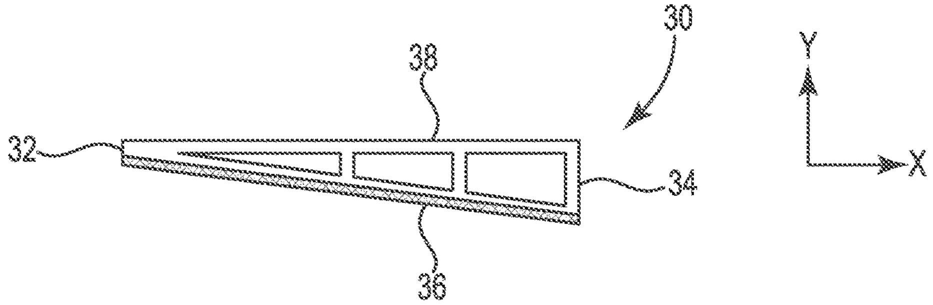
FIG. 6 is a plan view of the wedge of the retention clip assembly depicted in FIG. 3.

With reference to FIG. 6, where the wedge 30 is depicted alone, the wedge 30 includes a leading end 32 and a trailing end 34. The wedge 30 includes a thickness measured in a direction normal to the major surface 105 of the glass lite 104. In terms of the Cartesian coordinate system provided in the FIGS., the thickness of the wedge is measured along the Y axis while the leading end 32 and the trailing end 34 of the wedge 30 are positioned along the X axis. The thickness of the wedge 30 increases when moving from the leading edge 32 to the trailing edge 34. As a result, translation or sliding of the leading end 32 of the wedge 30 towards the first end 16-1 of the compression surface 16 in a compression direction aligned with the edge 106 of the glass lite 104 forces the wedge 30 into contact with the major surface 105 of the glass lite 104 along a direction transverse to the compression direction, i.e., along the Y axis in the depicted illustrative embodiment.

In the illustrative embodiment of wedge 30, a back surface 36 faces the compression surface 16 of the base member 12 of the retention clip assembly while a front surface 38 faces the major surface 105 of the glass lite 104. The thickness of the wedge 30 is, therefore, measured between the front surface 38 and the back surface 36 which are spaced apart from each other along the Y axis.

The orientation or angle of the compression surface 16 on the base member 12 of the retention clip assembly 10 is selected along with the angle formed by the back surface 36 and the front surface 38 of the wedge 30 such that the front surface 38 of the wedge 30 is oriented generally parallel to the major surface 105 of the glass lite 104 to distribute the force applied on the major surface 105 of the glass lite 104 over substantially the entire front surface 38 of the wedge 30 as the wedge 30 is advanced in the compression direction (i.e., the X axis) as described herein.

While movement of the wedge 30 along the compression direction as described herein provides a force on the major surface 105 of the glass lite 1042 retained the glass lite 104 in the frame opening, the wedge 30 may, in one or more embodiments, include features configured to retain the wedge 30 in a selected position relative to the compression surface 16 of the base member 12 of the retention clip assembly 10 so that the force generated by movement of the wedge 30 along the compression direction is maintained. In the depicted illustrative embodiment, the back surface 36 of the wedge 30 may include ridges that extend in a direction transverse to a wedge axis defined between the leading edge 32 and the trailing edge 34 of the wedge 30. In other words, in the view of wedge 30 as seen in FIG. 6, the ridges would extend into the page or along the Z axis on back surface 36.

The compression surface 16 on the base member 12 retention clip assembly 10 may include complementary set of ridges that also extend along the Z axis, with the ridges on the back surface 36 and compression surface 16 interacting to resist movement of the wedge 30 in a direction towards the second end 16-2 of the compression surface 16 after the ridges on the back surface 36 of the wedge 30 engage the ridges on the compression surface 16.

Figure 7:
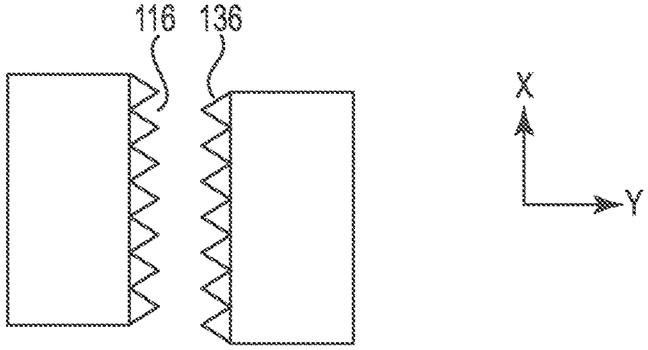
FIG. 7 is a schematic diagram depicting one illustrative embodiment of a plurality of ridges used to secure a wedge in position on a base member of a retention clip assembly as described herein.
Figure 8:
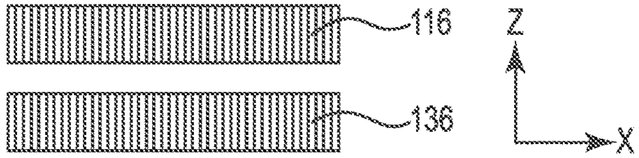
FIG. 8 is a schematic diagram depicting one set of the plurality of ridges depicted in FIG. 7, the view being taken along the Y axis.

Complementary sets of ridges 116 and 136 are depicted in each of FIGS. 7-8 with FIG. 7 providing a view along the Z axis and FIG. 8 depicting the opposing sets of ridges 116 and 136 also depicted in FIG. 8. The opposing sets of ridges 116 at 136 nested within each other at discrete locations as the wedge on which they are located moves in the compression direction as described herein.

Although complementary sets of ridges may be used to prevent the wedge of a retention clip assembly as described herein from backing out (i.e., moving in a direction opposite the compression direction) or releasing any force applied to a glass lite by the wedge, many other structures and/or materials could be used in place of complementary ridges on compression surface 16 on the base member 12 and the back surface 36 on the wedge 30. In one alternative embodiment, complementary sets of ridges could be provided on the bottom surface of the wedge 30 (i.e., the surface of the wedge 30 facing the frame member surface 103 of frame member 102) and the surface of the base member 14 facing the bottom of the wedge. Other alternative structures and/or materials may include, but are not limited to, adhesives, high friction surfaces, mechanical fasteners driven into the wedge and/or behind the wedge when the wedge is in the desired position relative to the compression surface, thermal and/or chemical welding of the wedge in position on the base member (using, e.g., a hot knife penetrating into the wedge and base member, ultrasonic welding, etc. for thermal welding).

Although the front surface 38 of the wedge 30 of the illustrative embodiment of retention clip assembly 10 is parallel with the major surface 105 of the glass lite 104, the back surface 36 of the wedge 30 of one or more embodiments of a retention clip assembly 10 as described herein may be angled relative to the major surface 105 of the glass lite 104. This feature can be seen in, for example, FIGS. 2, 5 and 9 where the back surface 36 of the wedge 30 is not aligned with the Z axis and the compression surface 16 of the retention clip assembly 10 is also not aligned with the Z axis. That canting or angling of the back surface 36 and compression surface 16 may assist in preventing unwanted movement of the wedge 30 along the Z axis as the wedge 30 is advanced in the compression direction.

Figure 5:
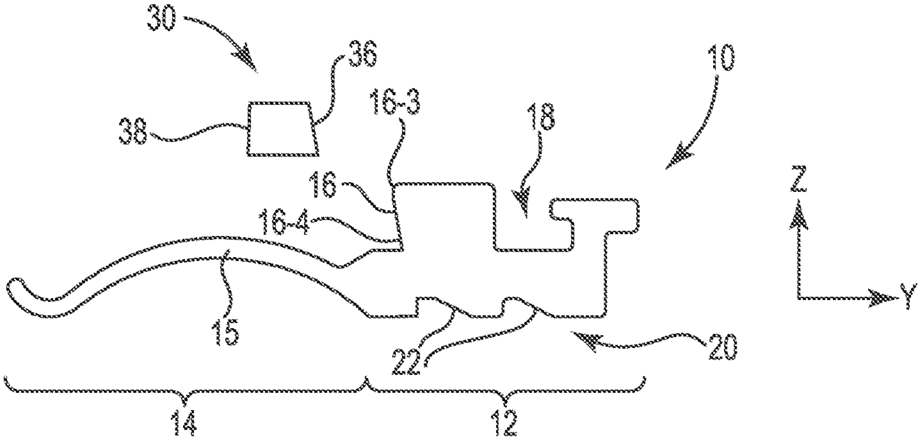
FIG. 5 is a side view of the base member and spring member of the retention clip assembly of FIGS. 2-4, with the wedge removed from contact with the base member of the retention clip assembly.
Figure 9:
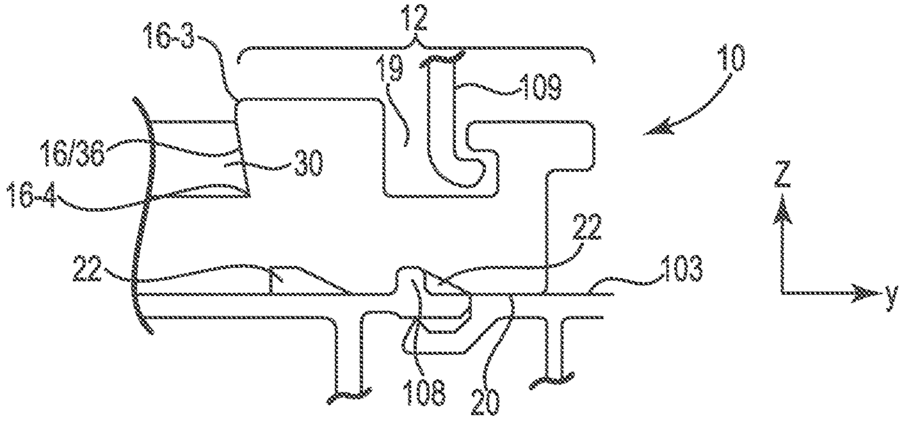
FIG. 9 is an enlarged partial view of a portion of the retention clip assembly of FIG. 2 depicting one illustrative embodiment of interlocking features on the base member and the frame member as described herein.
Figure 10:
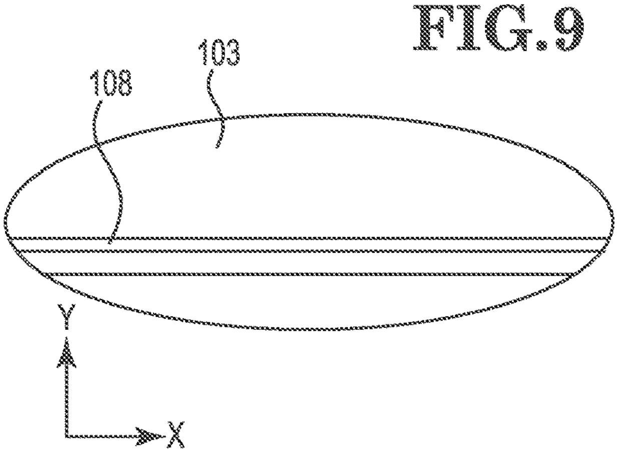
FIG. 10 is a schematic diagram depicting the ridge on the frame surface as viewed along the Z axis.
Figure 11:
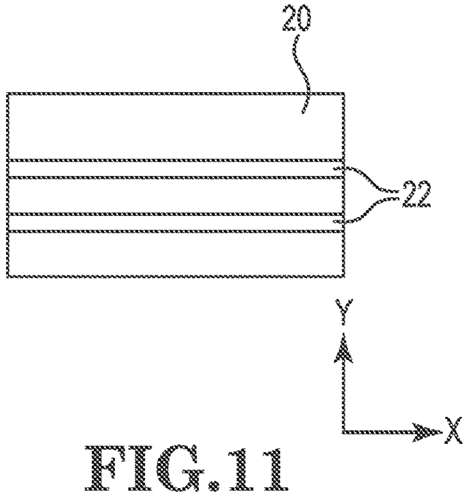
FIG. 11 is a schematic diagram depicting a pair of channels on the frame surface of a base member of one illustrative embodiment of a retention clip assembly as described herein.

In one or more embodiments, the compression surface 16 may be described as having a top edge 16-3 and a bottom edge 16-4 (see, e.g., FIGS. 5 and 9). The bottom edge 16-4 of the compression surface may be described as being located between the top edge 16-3 of the compression surface 16 and the frame member 102 when the retention clip assembly 10 is in its proper position. In one or more embodiments, the top edge 16-3 of the compression surface 16 is located closer to the major surface 105 of the glass lite 104 than the bottom edge 16-4 of the compression surface such that the compression surface is angled or canted relative to the major surface 105 of the glass lite 104.

To match the canted or angled compression surface 16, the back surface 36 of the wedge 30 may also be canted or angled such that the thickness of the wedge 30 may be described as decreasing when moving from the bottom edge 16-4 of the compression surface 16 to the top edge 16-3 of the compression surface 16 when the wedge 30 is in position relative to the compression surface 16. Because the back surface 36 of the wedge 30 follows or matches the angle of the compression surface 16, the thickness of the wedge 30 measured between the front surface 38 and the back surface 36 (i.e., along the Y axis) may be described as decreasing when moving from the bottom edge 16-4 to the top edge 16-3 of the compression surface 16 (i.e., generally along the Z axis).

Another feature that may form a part of one or more embodiments of the glass lite retention systems described herein is a glass stop member 40 that, in one or more embodiments, is configured to about the major surface 105 of the glass lite 104 above the wedge 30 of the retention clip assembly 10 as seen in FIG. 2. Although depicted only above a single retention clip assembly 10, the glass stop member 40 may preferably extend along the entire length of the frame member 102 so that the glass stop member 40 is positioned above and conceals each of the retention clip assemblies 10 located along frame member 102.

In the depicted illustrative embodiment, glass stop member 40 includes a glazing edge 44 which abuts the major surface 105 of the glass lite 104. In one or more embodiments, the glazing edge 44 may be in the form of a gasket that is configured to form a seal against the major surface 105 of the glass lite 104 to limit or prevent the passage of water, air, etc. past the seal.

The depicted illustrative embodiment of glass stop member 40 also includes a retention fin 42 configured to interact with a glass stop channel 19 provided on the base member 12 of the retention clip assembly 10. Interaction of the retention fin 42 with the glass stop channel 19 may, in one or more embodiments, force the glazing edge 44 into contact with the major surface 105 of the glass lite 104 to assist in formation of the seal between glazing edge 44 and major surface 105 of the glass lite 104.

The depicted illustrative embodiment of glass stop member 40 also interacts with a feature 17 on the frame member 102 to further assist in retention of the glass stop member 40 in position over the retention clip assemblies 10.

Figure 12:
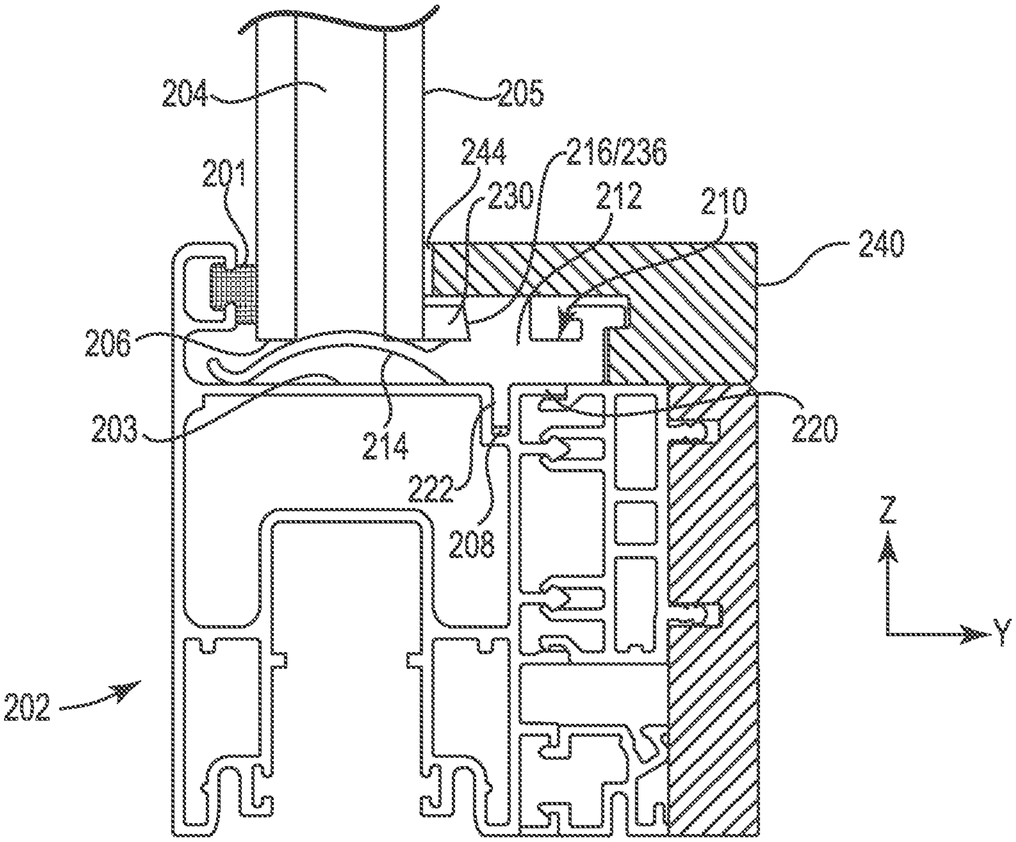
FIG. 12 is a cross-sectional view of another illustrative embodiment of a retention clip assembly retaining a glass lite in a frame opening.

A cross-sectional view of another illustrative embodiment of a retention clip assembly 210 that may be used to retain a glass lite 204 on a frame member 202 is depicted in FIG. 12. In many respects the retention clip assembly 210 and frame member 202 are similar to those depicted in FIG. 2. For example, frame member 202 includes a frame member surface 203 facing the edge 206 of the glass lite 204. Frame member 202 also carries a gasket 201 on one side of the glass lite 204 with the retention clip assembly acting on the opposite side, i.e., major surface 205, of glass lite 204.

The depicted illustrative embodiment of retention clip assembly 210 includes a wedge 230 that interacts with the base member 212 of the retention clip assembly 210 in the same manner as described above in connection with retention clip assembly 10. In the depicted embodiment, the base member 212 includes a compression surface 216 against which a back surface 236 of wedge 230 acts to provide a compression force using wedge 230 on the major surface 205 of glass lite 204.

A spring member 214 is attached to the base member 212 of the retention clip assembly 210 as discussed above in connection with retention clip assembly 10. When positioned in the frame opening on frame member 202, the spring member 214 of the retention clip assembly 210 is located between the edge 206 of the glass lite 204 and the frame member surface 203 of frame 202. In one or more embodiments, the spring member 214 may be at least partially compressed between the edge 206 of the glass lite 204 and the frame member surface 203 to, for example, provide friction to assist in retaining the retention clip assembly 210 in place during assembly of the glass lite 204 in the frame opening defined by frame member 202.

The illustrative embodiment of retention clip assembly 210 also includes a frame surface 220 on base member 212, with the frame surface 220 facing the frame member surface 203 of the frame member 202 when the retention clip assembly 210 is properly located relative to the frame member 202 and the glass lite 204 as seen in, e.g., FIG. 12.

The depicted illustrative embodiment of retention clip assembly 210 also includes interlocking features on the frame surface 220 of the base member 212 and the frame member surface 203 of the frame member 202. The interlocking features are provided to prevent movement of the base member 212 (and, therefore, the retention clip assembly 210 as a whole) in a direction transverse to a length of the frame member 102 (i.e., along the Y axis where the frame member extends along the X axis) when the spring member 214 is located between the edge 206 of the glass lite 204 and the frame member surface 203 of the frame member 202.

Figure 13:
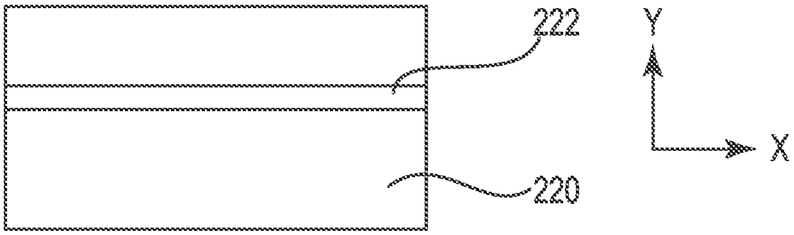
FIG. 13 is a plan view of the frame surface of the base member of the retention clip assembly of FIG. 12.

In FIG. 12, the depicted illustrative embodiment of retention clip assembly 210 includes interlocking features in the form of a channel 208 in the frame member 202 with the channel 208 extending away from the frame member surface 203 and the retention clip assembly 210 (i.e., along the Z axis) and a raised fin 222 extending away from the frame surface 220 of the base member 212 of the retention clip assembly 210. The raised fin 222 is seen in a plan view of the frame surface 220 of the retention clip assembly 210 in FIG. 13. Although depicted as a single unitary fin 222, one or more alternative embodiments of retention clip assembly 210 may include a series of posts or other projections configured to fit within channel 208 in frame member 202.

The fin 222 extends into channel 208 to restrict or prevent movement of the base member 212 of the retention clip assembly 210 from moving in the Y direction away from the glass lite 204. Although not depicted, alternative embodiments of frame member 202 may include two or more channels to allow for adjustment of the position of the retention clip assembly 210 along the Y axis. In yet another alternative, two or more fins 222 may extend downward from the frame surface 220 of base member 212 of retention clip assembly 210 to provide adjustment along the Y axis by removing fins that are not needed to interact with the frame member 2022 prevent movement along the Y axis.

Other differences in the glass lite retention system depicted in FIG. 12 from that depicted in FIG. 2 include the use of wood or other composite materials to form glass stop member 240 which also includes a glazing edge 244 configured to act against major surface 205 of glass lite 204 to provide a seal at that location as described herein.

Figure 14:
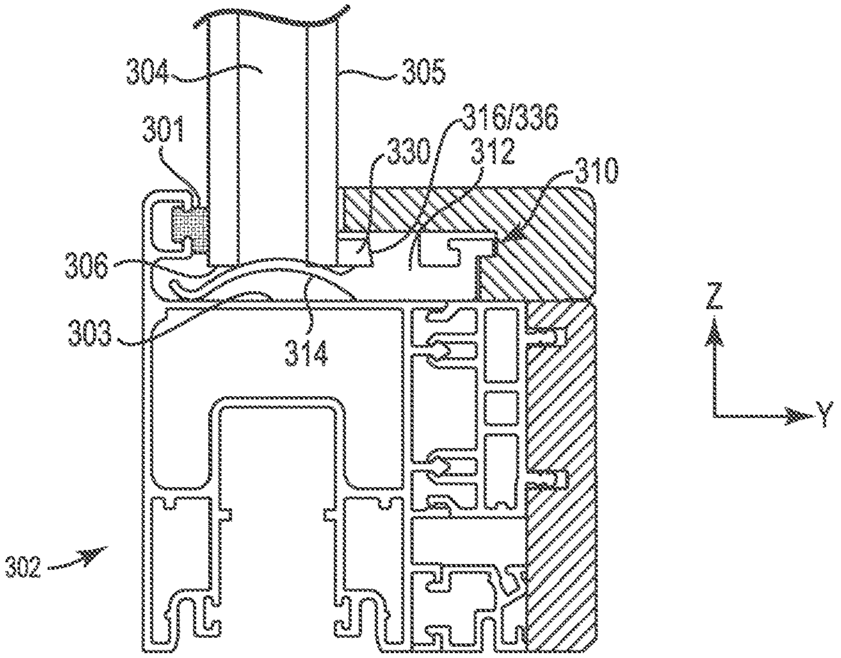
FIG. 14 is a cross-sectional view of another illustrative embodiment of a retention clip assembly retaining a glass lite in a frame opening.

A cross-sectional view of another illustrative embodiment of a retention clip assembly 310 that may be used to retain a glass lite 304 on a frame member 302 is depicted in FIG. 14. In many respects, the retention clip assembly 310 and frame member 302 are similar to those depicted in FIGS. 2 and 12. For example, frame member 302 includes a frame member surface 303 facing the edge 306 of the glass lite 304. Frame member 302 also carries a gasket 301 on one side of the glass lite 304 with the retention clip assembly acting on the opposite side, i.e., major surface 305, of glass lite 304.

The depicted illustrative embodiment of retention clip assembly 310 also includes a wedge 330 that interacts with the base member 312 of the retention clip assembly 310 in the same manner as described above in connection with retention clip assemblies 10 and 210. In the depicted embodiment, the base member 312 includes a compression surface 316 against which a back surface 336 of wedge 330 acts to provide a compression force using wedge 330 on the major surface 305 of glass lite 304.

A spring member 314 is attached to the base member 312 of the retention clip assembly 310. When positioned in the frame opening on frame member 302, the spring member 314 of the retention clip assembly 310 is located between the edge 306 of the glass lite 304 and the frame member surface 303 of frame 302. In one or more embodiments, the spring member 314 may be compressed between the edge 306 of the glass lite 304 and the frame member surface 203 to provide friction to assist in retaining the retention clip assembly 310 in place during assembly of the glass lite 304 in the frame opening defined by frame member 302.

The illustrative embodiment of retention clip assembly 310 also includes a frame surface 320 on base member 312, with the frame surface 320 facing the frame member surface 303 of the frame member 302 when the retention clip assembly 310 is properly located relative to the frame member 302 and the glass lite 304 as seen in FIG. 14.

The depicted illustrative embodiment of retention clip assembly 310 also includes interlocking features on the frame surface 320 of the base member 312 and the frame member surface 303 of the frame member 302. The interlocking features are provided to limit or prevent movement of the base member 312 (and, therefore, the retention clip assembly 310 as a whole) in a direction transverse to a length of the frame member 302 (i.e., along the Y axis where the frame member extends along the X axis) when the spring member 314 is located between the edge 306 of the glass lite 304 and the frame member surface 303 of the frame member 302.

Figure 15:
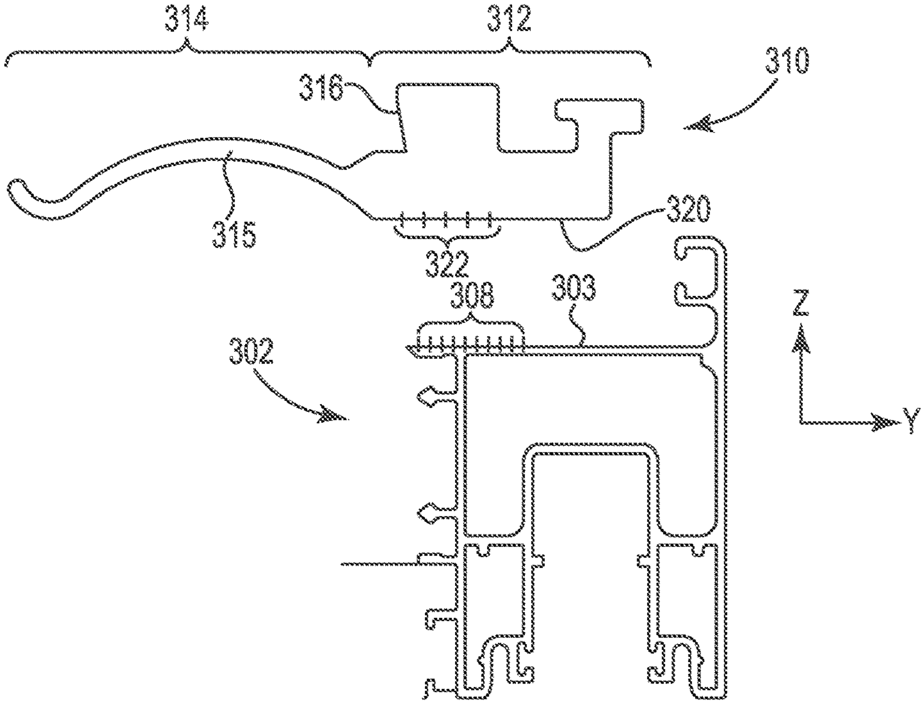
FIG. 15 depicts the base member and spring member of the retention clip assembly of FIG. 14 removed from contact with a portion of the frame member as depicted in FIG. 14.

In the embodiment depicted in FIGS. 14-15, the illustrative embodiment of retention clip assembly 310 includes interlocking features in the form of teeth, ridges, or other structural features protruding from interlocking features 322 on the frame surface 320 of retention clip assembly 310 as well as similar interlocking features 308 protruding from the frame member surface 303, with the interlocking features 322 on the frame surface 320 cooperating with interlocking features 308 on the frame member surface 303 to limit or prevent movement of the base member 312 as described herein.

The interlocking features used to prevent movement of the base member of a retention clip assembly away from the major surface of a glass lite may be more broadly described as a means for preventing movement of the base member in a direction transverse to a length of the frame member when the spring member is located between the edge of the glass lite and the frame member, wherein the means for preventing movement may include interlocking features such as the channels and ridges, fins and channels, and teeth/ridges, or other structural features protruding from the frame surface of a base member and the frame member surface. In addition, the means for preventing movement may, in one or more embodiments, also include mechanical fasteners used to fix the position of the base member relative to the frame member, and adhesives provided on one or both of the frame member surface of a base member and the frame member surface against which the base member sits (where the adhesive may be in the form of a layer of adhesive, and adhesive tape, etc.). Moreover, the means for preventing movement may include one or more of the features described herein, e.g., the interlocking features such as structural features protruding from one or both of the frame surface and the frame member surface in combination with one or more adhesives, etc.

Figure 16:
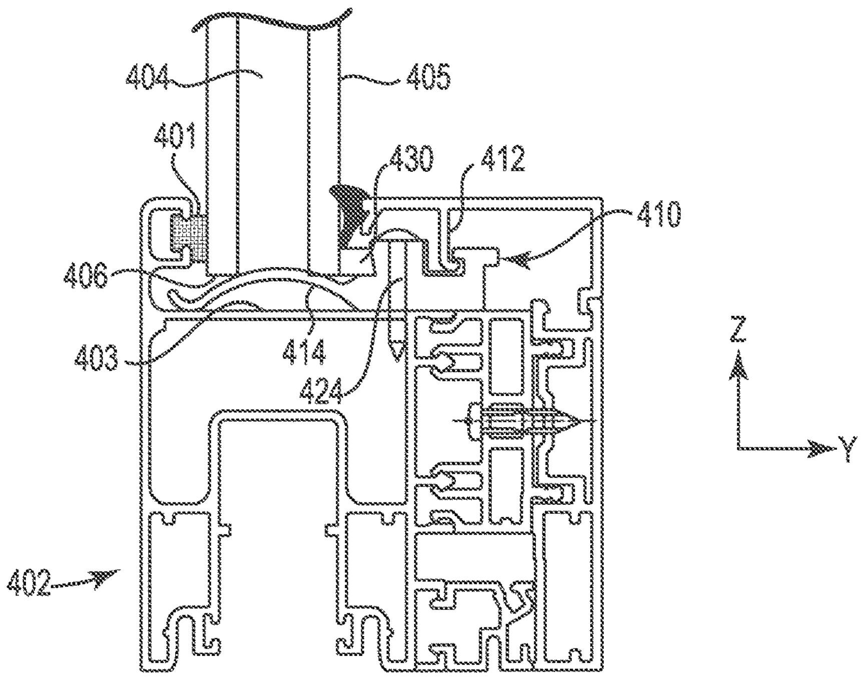
FIG. 16 is a cross-sectional view of another illustrative embodiment of a retention clip assembly retaining a glass lite in a frame opening.
Figure 17:
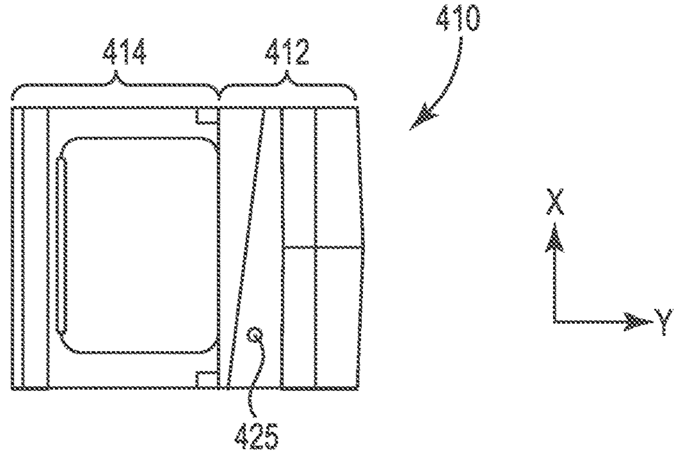
FIG. 17 is a plan view of the base member and spring member of the retention clip assembly of FIG. 16 taken along the Z axis.
Figure 18:
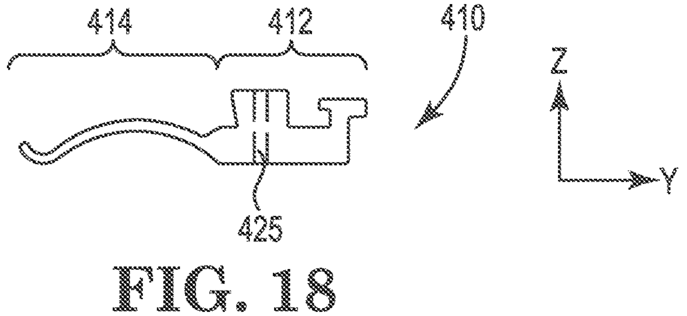
FIG. 18 is a side view of the base member and spring member of the retention clip assembly of FIG. 16 taken along the X axis.

A cross-sectional view of another illustrative embodiment of a retention clip assembly 410 that may be used to retain a glass lite 404 on a frame member 402 is depicted in FIGS. 16-18. In many respects, the retention clip assembly 410 and the frame member 402 are similar to those depicted in FIG. 2. For example, frame member 402 includes a frame member surface 403 facing the edge 406 of the glass lite 404. Frame member 402 also carries a gasket 401 on one side of the glass lite 404, with the retention clip assembly 410 acting on the opposite side, i.e., major surface 405, of glass lite 404.

The depicted illustrative embodiment of retention clip assembly 410 includes a wedge 430 that interacts with the base member 412 of the retention clip assembly 410 in the same manner as described above in connection with other embodiments of retention clip assemblies described herein. A spring member 414 is also attached to the base member 412 of the retention clip assembly 410. When positioned in the frame opening on frame member 402, the spring member 414 of the retention clip assembly 410 is located between the edge 406 of the glass lite 404 and the frame member surface 403 of frame 402.

In place of interlocking features used to prevent movement of the base member 412 (and, therefore, the retention clip assembly 410 as a whole) in a direction transverse to a length of the frame member 402 (i.e., along the Y axis where the frame member extends along the X axis), the depicted illustrative embodiment of retention clip assembly 410 includes a mechanical fastener 424 extending through a bore 425 in the base member 412 of the retention clip assembly 410, with the mechanical fastener 424 extending into the frame member 402 as seen in, e.g., FIG. 16. Although the depicted embodiment of mechanical fastener 424 has the appearance of a nail or pin, any suitable mechanical fastener could be used such as, but not limited to, nails, pins, rivets, staples, threaded fasteners, etc. Further, although a bore 425 may be provided in the retention clip assembly to allow for passage of the mechanical fastener, one or more embodiments of mechanical fasteners may be driven through the base member 412 in the absence of a predefined bore 425.

Figure 19:
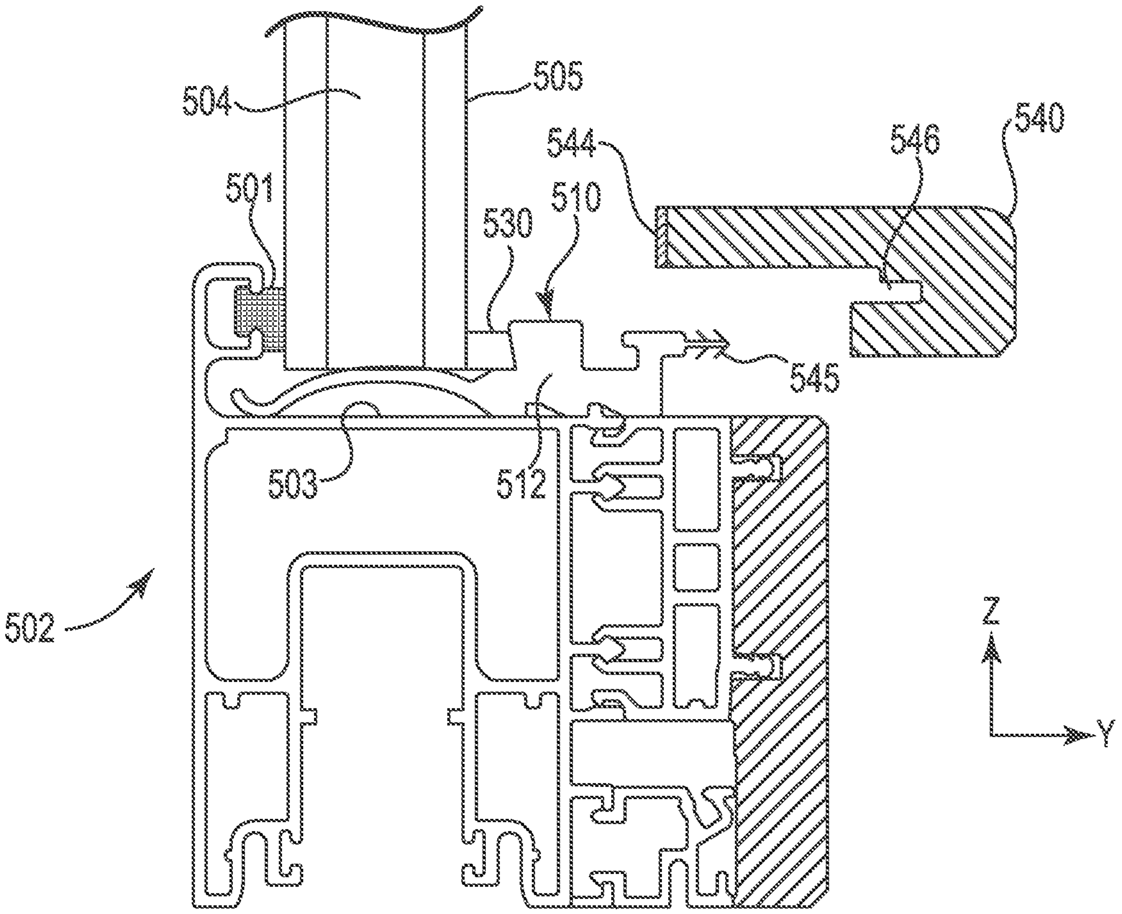
FIG. 19 is a cross-sectional view of another illustrative embodiment of a retention clip assembly retaining a glass lite in a frame opening, with the glass stop removed from its position over the base member of the retention clip assembly.

A cross-sectional view of another illustrative embodiment of a retention clip assembly 510 that may be used to retain a glass lite 504 on a frame member 502 is depicted in FIG. 19. In many respects, the retention clip assembly 510 and the frame member 502 are similar to those depicted in, e.g., FIG. 12. For example, frame member 502 includes a frame member surface 503 facing the edge 506 of the glass lite 504. Frame member 502 also carries a gasket 501 on one side of the glass lite 504, with the retention clip assembly 510 acting on the opposite side, i.e., major surface 505, of glass lite 504.

The depicted illustrative embodiment of retention clip assembly 510 includes a wedge 530 that interacts with the base member 512 of the retention clip assembly 510 in the same manner as described above in connection with other embodiments of retention clip assemblies described herein. A spring member 514 is also attached to the base member 512 of the retention clip assembly 510. When positioned in the frame opening on frame member 502, the spring member 514 of the retention clip assembly 510 is located between the edge 506 of the glass lite 504 and the frame member surface 503 of frame 502.

The illustrative embodiment of the glass lite retention system depicted in FIG. 19 includes a glass stop member 540 similar in many respects to glass stop member 240 depicted in FIG. 12. For example, glass stop member 540 includes a glazing edge 544 configured to act against major surface 505 of glass lite 504 as discussed herein.

One difference, however, is that glass stop member 540 includes a channel 546 that is configured to receive a glass stop member retainer 545 on retaining clip assembly 510. In particular, the channel 546 is configured to receive the glass stop member retainer 545 such that the glass stop member 540 is retained on the base member of the retention clip assembly 510 when the glazing edge 544 of the glass stop member 540 abuts the major surface 505 of the glass lite 504 above the wedge 530 of the retention clip assembly 510. The channel in glass stop member 540 and retainer on base member 512 of retention clip assembly 510 represent only one example of a variety of structures that could be used to retain the glass stop member 540 in position over the retention clip assembly 510.

FIGS. 20 and 21 illustrate the positioning of a glass stop member 640 over a set of retention clip assemblies 610 located on a frame member surface 603 of a frame member 602 defining a portion of a frame opening in which glass lite 604 is located. The frame member surface 603 includes an interlocking feature 608 (e.g., a ridge, channel, etc.) extending along its length, with the interlocking feature 608 interacting with interlocking features on the retention clip assemblies 610 to prevent movement of the retention clip assembly 610 away from the glass lite 604 along the Y axis as described herein. Retention clip assemblies 610 act on the major surface 605 of the glass lite 604 to force the glass lite 604 against a gasket 601 located opposite from the retaining clip assemblies 610 as described herein in connection with various other illustrative embodiments. Glass stop member 640 includes a glazing edge 644 configured to act on the major surface 605 of the glass lite 604 when the glass stop member 640 is positioned over the frame member surface 603 and retention clip assembly 610 as depicted in FIG. 21, with the glass stop member 640 being depicted separately from the frame member 602 in FIG. 20.

Figure 22:
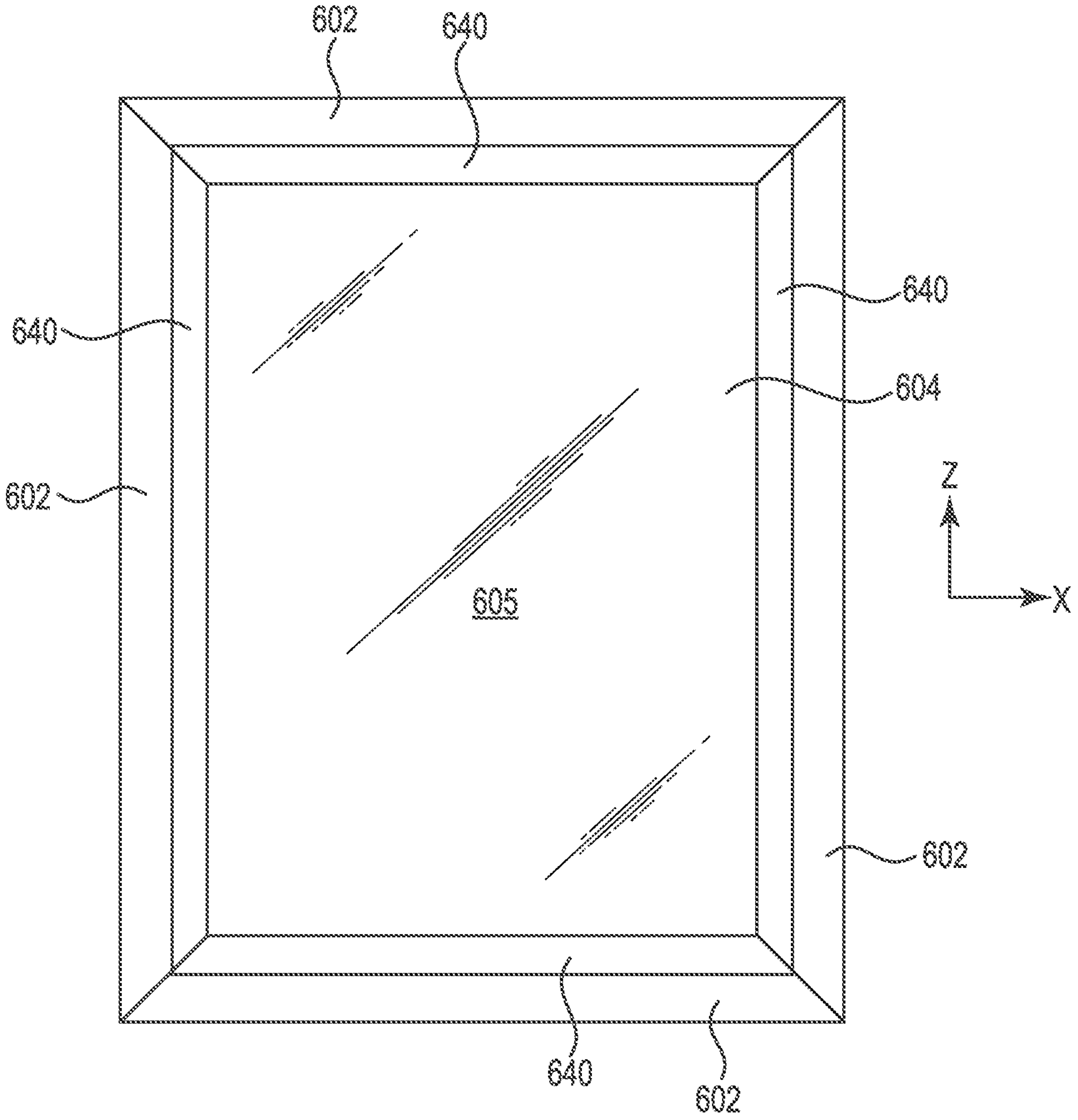
FIG. 22 is a plan view of another illustrative embodiment of a fenestration unit frame including a glass lite retained by a plurality of retention clip assemblies as described herein after positioning of glass stops over the retention clip assemblies on the frame members defining the frame opening in which the glass lite is located.

FIG. 22 depicts a fenestration unit frame formed by frame members 602 and defining a frame opening in which a glass lite 604 is located with a major surface 605 facing the viewer in FIG. 22. Also depicted in FIG. 22 are glass stop members 640 positioned along each of the frame members 602 such that the retention clip assemblies holding the glass lite 604 in position in the frame opening are covered by the glass stop members 640 to provide a finished appearance as well as protection of the retention clip assemblies.

The various components used in the retention clip assemblies, i.e., the base member, spring member, wedge, etc. may be constructed of any suitable material or combination of materials including polymers, metals, composites, wood, ceramic, etc. The particular materials used need only perform the functions of the various components as described herein and suitable choices for the materials will be known to those of skill in the art.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of retention clip assemblies, retention clip systems, and methods of using the same are discussed herein with some possible variations described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

The invention claimed is:

1. A glass lite retention system comprising:
- a glass lite positioned in a frame opening, wherein each edge of the glass lite faces a frame member defining a portion of the frame opening; and
- a plurality of retention clip assemblies positioned around a perimeter of the glass lite, wherein each retention clip assembly of the plurality of retention clip assemblies comprises:
  - a base member comprising:
    - a frame surface facing a frame member defining a portion of the frame opening, and
    - a compression surface facing a major surface of the glass lite, wherein the compression surface is angled relative to the length of the frame member such that a first end of the compression surface is closer to the major surface of the glass lite than a second end of the compression surface; and
  - a wedge located between the compression surface and the major surface of the glass lite, wherein the wedge comprises a leading end and a trailing end, wherein a thickness of the wedge measured in a direction normal to the major surface of the glass lite increases when moving from the leading edge to the trailing edge, and wherein translation of the leading end of the wedge towards the first end of the compression surface in a compression direction aligned with the edge of the glass lite forces the wedge into contact with the major surface of the glass lite.

2. A glass lite retention system according to claim 1, wherein the wedge comprises a front surface and a back surface, wherein the front surface faces the major surface of the glass lite and the back surface faces the compression surface of the base member, wherein the thickness of the wedge is measured between the front surface and the back surface.

3. A glass lite retention system according to claim 2, wherein the back surface comprises a first plurality of ridges extending transverse to a wedge axis extending between the leading edge and the trailing edge of the wedge, and wherein the compression surface comprises a second plurality of ridges extending transverse to the wedge axis, wherein the first plurality of ridges and the second plurality of ridges interact to resist movement of the wedge in a direction towards the second end of the compression surface after the first plurality of ridges on the wedge engage the second plurality of ridges on the compression surface.

4. A glass lite retention system according to claim 1, wherein the compression surface comprises a bottom edge and a top edge, wherein the bottom edge is located between the top edge and the frame member, and wherein the top edge is located closer to the major surface of the glass lite than the bottom edge such that the compression surface is angled relative to the major surface of the glass lite.

5. A glass lite retention system according to claim 4, wherein the thickness of the wedge measured in a direction normal to the major surface of the glass lite decreases when moving from the bottom edge to the top edge of the compression surface.

6. A glass lite retention system according to claim 1, wherein the wedge comprises a front surface facing the major surface of the glass lite, wherein the front surface is oriented parallel to the major surface of the glass lite, and wherein the compression surface of the base member is not parallel to the major surface of the glass lite.

7. A glass lite retention system according to claim 1, wherein the wedge comprises a front surface facing the major surface of the glass lite, wherein the front surface is oriented parallel to the major surface of the glass lite, wherein the compression surface of the base member is not parallel to the major surface of the glass lite, and wherein the wedge and the compression surface are configured to move the front surface of the wedge in a direction parallel to the major surface of the glass lite as the wedge is moved between the compression surface and the major surface of the glass lite to force the wedge into contact with the major surface of the glass lite.

8. A glass lite retention system according to claim 7, wherein the compression surface comprises a bottom edge and a top edge, and wherein the top edge is located closer to the major surface of the glass lite than the bottom edge such that the compression surface is angled relative to the major surface of the glass lite.

9. A glass lite retention system according to claim 8, wherein the thickness of the wedge measured in a direction normal to the major surface of the glass lite decreases when moving from the bottom edge to the top edge of the compression surface.

10. A glass lite retention system according to claim 1, wherein each retention clip assembly of the plurality of retention clip assemblies comprises interlocking features on the frame surface of the base member and the frame member, wherein the interlocking features prevent movement of the base member in a direction transverse to a length of the frame member when the retainer is located between the edge of the glass lite and the frame member.

11. A glass lite retention system according to claim 10, wherein the interlocking features comprise a channel in the frame member and a raised fin extending from the frame surface of the base member, wherein the channel is configured to receive the fin when the spring member is located between the edge of the glass lite and the frame member.

12. A glass lite retention system according to claim 10, wherein the interlocking features comprise a channel on the frame surface of the base member and a ridge extending from the frame member towards the frame opening, wherein the channel is configured to receive the ridge in an interlocking relationship.

13. A glass lite retention system according to claim 12, wherein the frame surface of the base member comprises a plurality of channels arranged to change the position of the base member with respect to the glass lite when the ridge on the frame member is located in different channels of the plurality of channels.

14. A method of retaining a glass lite in a frame opening of a frame, the method comprising:

locating a plurality of retention clip assemblies along a perimeter of a glass lite located in a frame opening of a frame, wherein locating each retention clip assembly of the plurality of retention clip assemblies comprises positioning a frame surface of a base member on the frame member adjacent the glass lite such that a compression surface of the base member faces a major surface of the glass lite, wherein the compression surface is angled relative to the length of the frame member such that a first end of the compression surface is closer to the major surface of the glass lite than a second end of the compression surface;

preventing movement of the base member of each retention clip assembly of the plurality of retention clip assemblies in a direction normal to the major surface of the glass lite when the frame surface of the base member is positioned on the frame surface of the base member by aligning interlocking features on the frame surface of the base member and the frame member; and providing a retention force on the major surface of the glass lite to retain the glass lite in the frame opening using each retention clip assembly of the plurality of retention clip assemblies by, for each retention clip assembly of the plurality of retention clip assemblies, advancing a wedge between the compression surface and the major surface of the glass lite in a direction parallel to the major surface of the glass lite and aligned with the edge of the glass lite retaining the spring member, wherein the wedge is forced into contact with major surface of the glass lite to provide the retention force.

15. A method according to claim 14, wherein the wedge of each retention clip assembly of the plurality of retention clip assemblies comprises a leading end and a trailing end, wherein advancing the wedge comprises advancing the leading end of the wedge towards the first end of the compression surface to force the wedge into contact with the major surface of the glass lite.

16. A method according to claim 14, wherein the interlocking features comprise a channel in the frame member and a raised fin extending from the frame surface of the base member, wherein aligning the interlocking features comprises locating the fin in the channel.

17. A method according to claim 14, wherein the interlocking features comprise a channel on the frame surface of the base member and a ridge extending from the frame member towards the frame opening, wherein aligning the interlocking features comprises locating the ridge in the channel.

18. A method according to claim 17, wherein the frame surface of the base member comprises a plurality of channels arranged to change the position of the base member with respect to the glass lite when the ridge on the frame member is located in different channels of the plurality of channels.

19. A method according to claim 14, wherein the method comprises retaining the wedge in position relative to the compression surface after advancing the wedge between the compression surface and the major surface of the glass lite.

20. A method according to claim 19, wherein retaining the wedge in position comprises aligning interlocking ridges on each of the wedge and the compression surface.

* * * * *